United States Patent [19]

Lingo, Jr.

[11] Patent Number: 4,954,266
[45] Date of Patent: Sep. 4, 1990

[54] METHOD AND SYSTEM FOR RECOVERING FREE FLOATING LIQUIDS FROM GROUND WATER

[76] Inventor: Lowell Lingo, Jr., R.D. #1, Box 53, Pleasant Valley Rd., Morrisville, N.Y. 13408

[21] Appl. No.: 252,648
[22] Filed: Oct. 3, 1988
[51] Int. Cl.⁵ .............................................. E02B 15/08
[52] U.S. Cl. ...................... 210/747; 166/53; 166/372; 210/97; 210/170; 210/242.3; 210/540; 210/776
[58] Field of Search ............... 166/53, 265, 372; 417/118, 138; 210/123, 86, 104, 170, 188, 220, 242.1, 242.3, 747, 776, 800, 923, 540, 513, 514, 801, 901, 97

[56] References Cited

U.S. PATENT DOCUMENTS

| | | | |
|---|---|---|---|
| 2,744,630 | 5/1956 | Hughes | 210/540 |
| 3,638,796 | 2/1972 | Tuggle et al. | 210/170 |
| 3,762,548 | 10/1973 | McCabe | 210/540 |
| 3,849,311 | 11/1974 | Jakubek | 210/539 |
| 4,126,182 | 11/1978 | Allen et al. | 166/372 |
| 4,273,650 | 6/1981 | Solomon | 210/104 |
| 4,410,041 | 10/1983 | Davies et al. | 166/372 |
| 4,497,370 | 2/1985 | Breslin | 166/372 |
| 4,606,703 | 8/1986 | Baines | 417/138 |
| 4,625,807 | 12/1986 | Harlow | 210/104 |
| 4,663,037 | 5/1987 | Breslin | 210/170 |
| 4,746,423 | 5/1988 | Moyer | 210/923 |
| 4,761,225 | 8/1988 | Breslin | 210/923 |
| 4,793,408 | 12/1988 | Miffre | 166/53 |
| 4,805,697 | 2/1989 | Fouillout et al. | 166/53 |

Primary Examiner—Frank Spear
Assistant Examiner—Joseph Drodge
Attorney, Agent, or Firm—Charles S. McGuire

[57] ABSTRACT

A method and system for removing and recovering fuel oil, and other liquid hydrocarbons, from ground water. A well is drilled and the ground water and any other liquid floating thereon are allowed to enter the well. An enclosed tank is filled with water, and essentially sealed to prevent ingress of air. An outlet tube is connected to the tank at one end, and its other end is placed in the well, below water level. Another tube is connected at one end to the tank and fixedly attached at the other end to a float device at a position above the hydrocarbon/water interface. As water drains from the tank into the well it is replaced by the liquid hydrocarbon which is thus forced to travel up the tube into the tank. Thus, this system is operated entirely by gravity due to the difference in specific gravities of water and the liquid hydrocarbon, and no pump or other external power source is required.

6 Claims, 2 Drawing Sheets

METHOD AND SYSTEM FOR RECOVERING FREE FLOATING LIQUIDS FROM GROUND WATER

BACKGROUND

This invention relates to methods and systems for the recovery of subsurface liquids having a specific gravity less than one and, more particularly, to a novel and efficient system for recovering and separating fuel oil, and the like, from the ground water table.

Underground storage tanks are typical enclosures for fuel oil reserves. Defective and decaying tanks may crack and leak their contents into the subsurface, ultimately reaching the water table and contaminating the ground water supply. Fuel oil and other liquid contaminants may also enter the ground water due to leaks or spills above ground level. Since oil and water are generally immiscible substances, with the specific gravity of oil being lower than that of water, oil will collect and form a layer atop of a body of water. Means to collect oil layers found in ground water usually require the drilling of a well for access to the water table and some sort of mechanical pumping device to force the oil up to the surface. Existing systems use external power for pumping or lifting the oil from the recovery well and/or for regulating the height of the surface level in the well.

It is therefore a main object of the present invention to provide a system for the removal and separation of fuel oil from ground water which requires no external power to operate.

A further object is to provide a system for the removal and separation of fuel oil from ground water which relies upon the difference in specific gravities of fuel oil and water as its principle of operation.

Still another object is to provide a system for the removal and separation of fuel oil from ground water whose fuel oil removal capacity is limited only by the size of the water/storage tank and the size of the tubing to the well.

A still further object is to provide an inexpensive, flexible system for the removal and recovery of fuel oil from ground water which requires no maintenance except for an occasional flushing of the lines.

Other objects will in part be obvious and in part appear hereinafter.

SUMMARY OF THE INVENTION

There is provided an improved method and system for recovery and separation of liquid hydrocarbons which have escaped from storage tanks and other facilities into the ground and reside on the top of ground water. In accordance with conventional terminology, the liquid to be removed will be termed the "product." In the invention, recovery of liquid hydrocarbons is made from the inside of a well casing. The invention requires no electronic sensors or switches inside or outside of the well; thus, the possibility of fire or explosion in a well due to heat or sparks from electrical circuitry is eliminated. The invention requires no vertical positioning device other than its own structural body and this feature reduces the complexity, cost and electrical requirements in the field of underground oil spill recovery.

In the practice of the present invention, a liquid hydrocarbon recovery unit recovers lighter-than-water immiscible hydrocarbons. The recovery unit is of the cylindrically shaped, free-floating type, an example of which may be seen in U.S. Pat. No. 4,663,037, issued to Breslin on May 5, 1987. The present recovery unit is constructed such that it floats in liquid hydrocarbons with its liquid recovery inlet, positioned midway the length of the unit, always immersed in the liquid hydrocarbon. This inlet is the only fluid entrance to the recovery unit for the liquid hydrocarbons. Upon the essentially complete extraction of the liquid hydrocarbon layer, the recovery unit will float in the ground water which has entered the well. Ground water will then be drawn through the immersed recovery inlet and enter the recovery unit. At no time does the inlet rise above the level of liquids in the well; therefore, no air is introduced into the system.

As will be described and shown in the ensuing description, the oil recovery system of the present invention relies solely upon the differences in the specific gravities of liquid hydrocarbons (0.5-0.85), and water (1.0), and therefore may be described herein as a "gravity pump". No mechanical or electrical power supplies of any type, internal or external to the well, are required for operation of the present recovery system.

The liquid hydrocarbons are removed from the recovery unit, which is placed in a pre-drilled well, via a first tube (product riser tube). This tube includes a first open end which is securely attached to and thus follows the recovery unit as it rises and falls in respect to changes in the water level within the well. A second tube (water delivery tube) passes loosely through an opening in the recovery unit and is fixed with respect to the well casing, its lower, open end, being immersed in the well water. The water delivery tube delivers water from an enclosed tank above into the well as liquid is simultaneously drawn upwardly through the product riser tube into the same tank. The water delivery tube also serves to maintain the recovery unit in an essentially vertical, central position in the well casing by extending through an opening at the center of the unit and also through one or more centering rings positioned below and/or above the float device (recovery unit).

Both tubes are fixedly attached at their upper ends to a portable, air tight, water storage tank positioned outside the well. The system behaves as a simple manometer. As water is delivered into the well from the storage tank via the water delivery tube, the pressure (P) at any point along the tube at a given height is equal to the specific gravity of water ($\gamma$) times the height (h), i.e., $P = \gamma h$. When a layer of product of thickness $\Delta h$ is introduced into the product riser tube, the pressure at the product/water interface in the riser tube becomes $\gamma(h - \Delta h) + \gamma_p \Delta h$, where $\gamma_p$ = the specific gravity of the product. Pressure at the same level in the water delivery tube is $\gamma h$. Since $\gamma_p$ product $<<\gamma$ (water), then pressure in the product riser tube < the pressure in the water delivery tube, and the product in the riser tube begins to flow in an upward direction. The product rises into the storage tank where it replaces the water which flows into the well via the water delivery tube. After essentially all of the product has been collected, the product/water interface will reach the level of the inlet on the float. The gravity pump then continues to draw water up through the product riser tube until the height of the water in the riser tube reaches the height of the product/water interface in the storage tank. At this point the system reaches equilibrium and shuts itself down.

When product has accumulated in the water storage tank, it may be removed via an attachable transfer hose which connects to the storage tank at one end and a product receiving container at its opposite end. A series of manually operative valves control the working of the system. Downward flow of water and upward flow of product continues until the thickness of the product layer in the well is such that the water-product interface is above the upper level of the float inlet ports.

DETAILED DESCRIPTION

Figure 1:
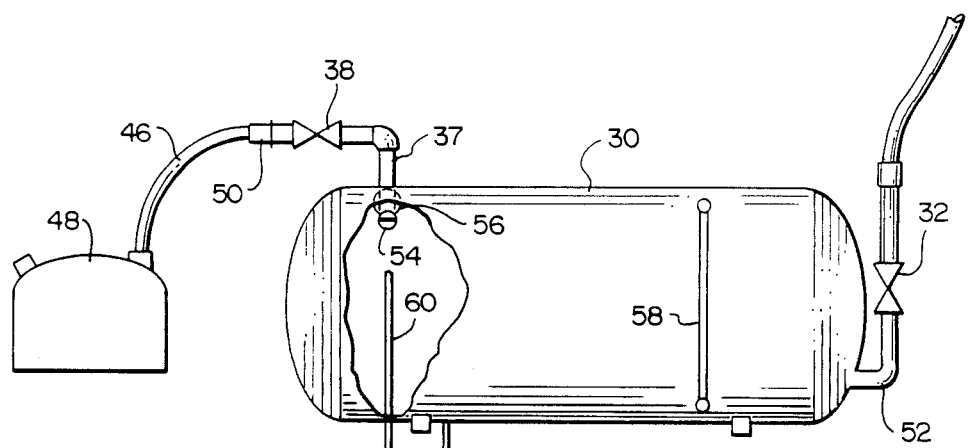
FIG. 1 is a somewhat diagrammatic illustration of the gravity recovery system of the present invention.

There is shown in FIG. 1 a liquid hydrocarbon recovery unit 10 floating inside a well casing 12 which has perforations 14 to allow product such as liquid hydrocarbons and ground water, respectively indicated as layers 16 and 18, to enter the well.

Figure 3:
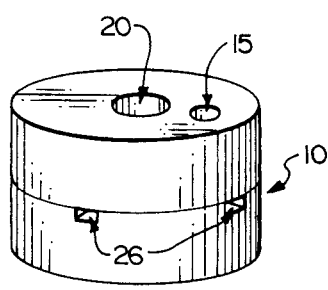
FIG. 3 is a perspective view of the element of FIG. 1 after the two initially separate portions are joined.
Figure 2:
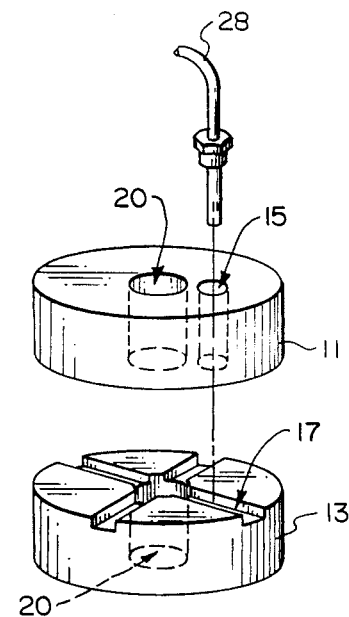
FIG. 2 is an exploded, perspective view of a preferred construction of one of the elements of FIG. 1.
Figure 4:
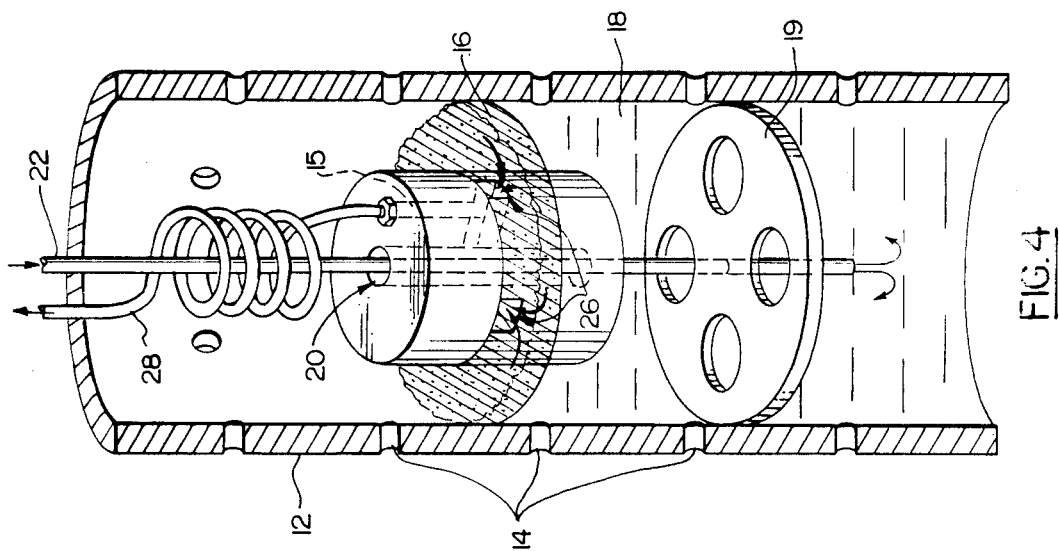
FIG. 4 is an enlarged, perspective view of portions of FIG. 1, showing the recovery device of the apparatus in a desirable central and vertical position within a well casing.

As can be seen in FIGS. 2–4, the unit 10 includes a solid bodied, single part of cylindrical shape with bore 20 drilled through it, preferably along the central axis. As seen in FIG. 2, the body of unit 10 may initially be formed in two, upper and lower sections 11 and 13, respectively, bore 20 extending through both. A second bore 15 is formed in upper section 11 to receive the lower, open end of product riser tube 28 which is fixedly secured to unit 10. An X-shaped channel 17 is formed in the upper surface of lower section 13. When sections 11 and 13 are permanently joined, as in FIG. 3, four inlet openings 26 are formed so that liquid in which unit 10 is partially submerged may enter channel 17, in which the lower end of tube 28 is positioned.

Figure 5:
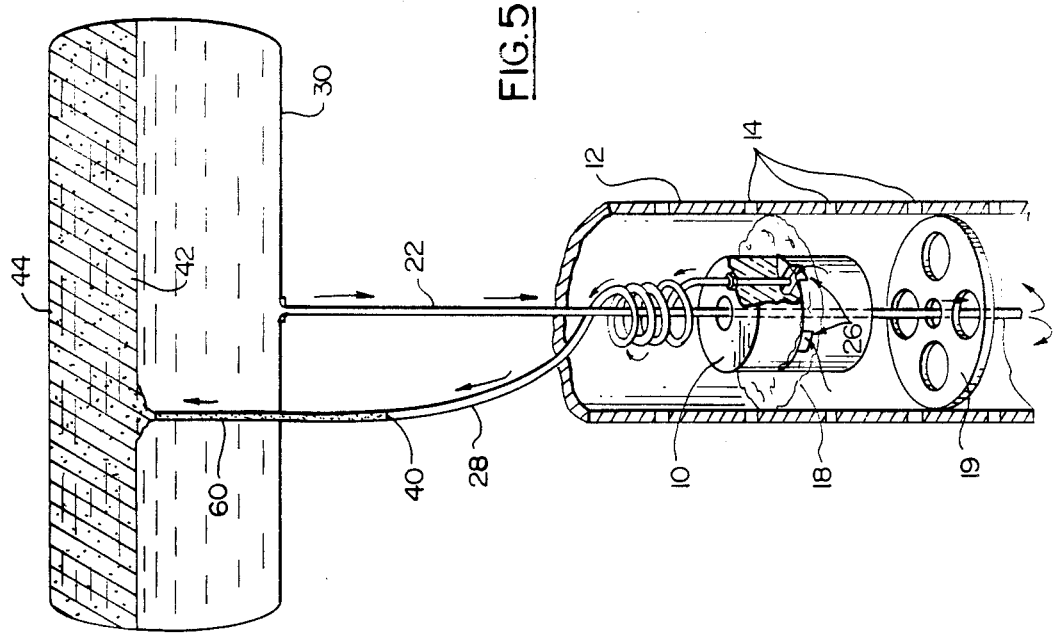
FIG. 5 is an illustration similar to FIG. 1, showing the liquids in a transient position within the system.

Bore 20 provides a sliding fit passageway for the water delivery tube 22 to pass through unit 10. Tube 22 may be affixed to well casing 12 as seen in FIG. 1 by clamping means denoted by reference numeral 23 such that it maintains an essentially central position within casing 12. One or more centering rings 19 are provided to maintain tube 22 and thus unit 20 in a central position in well casing 12, tube 22 extending through a centrally placed hole in ring 19. The recovery unit 10 is constructed such that inlets 26 are always submersed in the product layer 16, when present, and always submersed in water 18 when layer 16 is not present. An example of a material of which the body of recovery unit 10 can be constructed is "BUNA-N" nitrofilm which is a hard, but buoyant foam. When the product layer 16 becomes sufficiently thickened by an inflow into the well casing 12 of liquid hydrocarbons, or the like, the recovery unit 10 will rise such that inlets 26 are submerged within product layer 16. When this occurs product flows into the inlets 26 and thus channel 17 in the body of the recovery unit 10, connecting to product riser tube 28. Tube 28 may be coiled around water delivery tube 22 as shown in FIGS. 1, 3 and 5 to provide slack in the line as unit 10 moves upward and downward with respect to the liquid level in the well casing 12.

As seen in FIG. 1, water delivery tube 22 connects to an air-tight water storage tank 30 at a point outside of well casing 12 and travels down casing 12, through bore 20 in unit 10 and terminates below the surface of the ground water 18.

In operation of the invention, tank 30 is filled completely with water through appropriate means such as water fill port 52 and valve 32. Both tubes 22 and 28 include valves 34 and 36, respectively, which are closed at this stage of operation, i.e., the filling of tank 30. Oil removal port 37 includes oil removal valve 38 which is opened to vent air on initial filling, water fill valve 32 is then opened to permit filling of tank 30 with water from an external source. When tank 30 is completely filled with water, valves 32 and 38 are closed and valve 34 on water delivery tube 22 is opened such that water will travel from tank 30 down through tube 22 and enter the ground water in well casing 12, while creating a negative pressure in tank 30. With tube 22 now filled completely with water, product recovery tube valve 36 is opened and the gravity pump is functioning. Since the system is air-tight and under negative pressure, the small volume of air in the product riser tube will rise into the tank, drawing behind it product, if present, or water until the product riser tube is filled.

If any liquid hydrocarbons should enter into well casing 12 and form a layer atop of the ground water, unit 10 will rise slightly such that inlets 26 are immersed within layer 16. Liquid hydrocarbons will now enter into recovery tube 28, and since the pressure of the product in tube 28 is less than the pressure of the water in tube 22, as hereinbefore explained, the product in tube 28 will begin to flow in an upward direction. The product will continue to rise up to tank 30 where it displaces the volume of water delivered into well 12 through delivery tube 22. Liquid layer 16 will continue to be drawn up through riser tube 28 and collect in tank 30 until layer 16 is essentially gone. Inlets 26 will then proceed to take in water from layer 18 which begins to rise up tube 28, creating a product/water interface as seen in FIG. 5 and denoted by reference numeral 40. Interface 40 continues to rise up tube 28 as water is drawn through inlets 26 and up tube 28 until the product/water interface 40 in tube 28 enters tank 30 and reaches the level of the product/water interface 42 in tank 30. At this point the system reaches equilibrium and shuts itself down.

At the completion of the pumping cycle, there will be a residual layer of liquid hydrocarbon of depth D remaining in the well (ranging from $\frac{1}{8}''-\frac{1}{4}''$). This depth can be controlled by adjusting the weight of the unit 10. It should, however, be deep enough so that no air will be introduced into the system.

The product layer 44 accumulated in tank 30 may be removed by first closing tube valves 34 and 36. A product transfer hose 46, as seen in FIG. 1, is connected to a receiving container 48 at one end and to the product removal port 50 located at an upper region of tank 30, at the other end. Both water fill valve 32 and product removal valve 38 are opened such that water enters tank 30 through water fill port 52 located at a lower region of tank 30, and liquid hydrocarbon layer 44 is forced through hose 46 and collects in container 48.

A float 54 which has a specific gravity lighter than water yet more than that of the product (e.g., about 0.95), is provided in tank 30 such that it floats at interface 42. When interface 42 rises to the point of intake 56 of the removal port 50, float 54 will enter intake 56 and close the removal line 46 such that no water may enter the container 48. Once this removal of the liquid hydrocarbon layer 44 in tank 30 is completed, the closing of valves 32 and 38 and the opening of valves 36 and 34 will restart the gravity pumping cycle.

It is contemplated that tank 30 be portable and that it include vacuum and sight gauges, such as that denoted by reference numeral 58 to monitor the level of product in the tank and in the well. Also, to assist in maintaining a more stable product/water interface within tank 30, it is preferred that tube 60 (FIGS. 1 and 5) be connected to the upper end of product riser tube 28 and extend to a desired height within tank 30. It should also be noted that, in situations where it is desireable to remove product over a relatively large area, several wells may be provided with a recovery unit and product riser tube positioned in each well; however, only a single tank of suitable capacity and a single water delivery tube leading into one of the wells need be provided.

While the invention has been disclosed in a preferred embodiment, it should be understood that the principle employed is that of barometric support of a liquid column and gravity-induced flow due to differences in specific gravity of two mutually immiscible liquids. Although the disclosed embodiment involves the drilling of a well and the removal of a floating layer of subsurface liquid therefrom utilizing separate lines for downward flow of water and upward flow of the lighter liquid, the invention is operative in environments other than a drilled well. Also, a single flow conduit, large enough in diameter to permit flow of water and product in opposite directions without interference such as would be caused by surface tension of the liquids within a small conduit, could be utilized. Furthermore, while a float device having one or more inlet ports normally positioned above the water-product interface within the body of liquid being removed is preferred, the invention is operable in principle without such a float device.

What is claimed is:

1. A method of removing a liquid hydrocarbon having a specific gravity less than one from the surface of a body of water within a pre-drilled well upon which said hydrocarbon is floating solely by means of barometric and gravitational forces, without the use of externally powered means, said method comprising:
    (a) positioning an airtight reservoir at a vertical level higher than that of said first liquid;
    (b) filling said reservoir with water;
    (c) providing a vent selectively movable between open and closed positions in an upper portion of said reservoir, opening said vent to permit communication of said reservoir with the atmosphere during said filling step, and closing said vent to render said reservoir airtight upon completion of said filling step;
    (d) connecting upper and lower ends of an enclosed, elongated first tube in airtight communication with the interior of said reservoir and said body of water within said well, respectively;
    (e) connecting upper and lower ends of an enclosed, elongated second tube in airtight communication with the interior of said reservoir and a floatation device, respectively;
    (f) placing said floatation device in said body of water within said well, said floatation device having a buoyancy so related to the specific gravities of said first liquid and said body of water that said second tube lower end remains just below the surface of said hydrocarbon as the distance between said reservoir and the surface of said hydrocarbon varies;
    (g) positioning at least one selectively actuable valve in each of said first and second tubes, closing said valves during said filling step, and opening said valves following closing of said vent; and
    (h) permitting said water to flow through said first tube by gravity out of said reservoir into said well and said hydrocarbon to rise through said second tube by barometric pressure into said reservoir to replace said water flowing therefrom.

2. A system for removing a water-immiscible liquid from the surface of a body of water upon which said liquid is floating solely by means of barometric and gravitational forces, without the use of externally powered means, said system comprising:
    (a) an airtight reservoir initially filled with water;
    (b) an elongated first tube having an upper end in airtight communication with said reservoir and a lower end at a vertical level below the upper surface of said liquid;
    (c) an elongated second tube having upper and lower ends respectively in airtight communication with said reservoir and said liquid;
    (d) a floatation device having a buoyancy such that an upper portion of said device is above and a lower portion is below the interface of said liquid and said body of water, said second tube lower end being connected to said floatation device at a position above said interface and below the surface of said liquid; and
    (e) first and second, individually operable valves interposed in said first and second tubes, respectively, said valves being selectively movable between open and closed positions to permit and prevent flow therethrough, whereby, when said valves are open, water may flow from said reservoir by gravity downwardly through said first tube and said liquid may rise through said second tube into said reservoir by barometric pressure to replace water flowing therefrom.

3. The system of claim 2 wherein said first tube lower end is positioned in said body of water.

4. The system of claim 3 wherein said floatation device includes a bore extending therethrough and said first tube extends loosely through said bore.

5. The system of claim 4 and further including a product removal line communicating with an upper portion of said reservoir, and a third selectively operable valve interposed in said product removal line to permit withdrawal of said liquid from said reservoir.

6. The system of claim 5 and further including means responsive to the level of the interface between said liquid and said water within said reservoir to close said third valve when said interface rises to a predetermined level within said reservoir.

* * * * *